United States Patent [19]

Wagner

[11] Patent Number: 4,651,769
[45] Date of Patent: Mar. 24, 1987

[54] LUBRICATED WATER VALVE

[75] Inventor: Fritz Wagner, Endingen, Fed. Rep. of Germany

[73] Assignee: Friedrich Grohe Armaturenfabrik GmbH & Co., Hemer, Fed. Rep. of Germany

[21] Appl. No.: 839,814

[22] Filed: Mar. 12, 1986

Related U.S. Application Data

[63] Continuation of Ser. No. 634,761, Jul. 26, 1984, abandoned.

[30] Foreign Application Priority Data

Jul. 26, 1983 [DE] Fed. Rep. of Germany ....... 3326842

[51] Int. Cl.$^4$ .................... F16K 3/36; F16K 11/02
[52] U.S. Cl. .................. 137/246.13; 137/625.17; 251/355; 184/18
[58] Field of Search .............. 137/246.13, 625.17, 137/625.4, 625.41; 251/324, 325, 355; 184/18

[56] References Cited

U.S. PATENT DOCUMENTS

| 837,644 | 12/1906 | Reilly | 137/246.13 |
|---|---|---|---|
| 2,219,271 | 10/1940 | Penick et al. | 137/246.13 |
| 2,965,351 | 12/1960 | Campbell | 251/325 |
| 3,372,904 | 3/1968 | Graham | 251/355 |
| 3,456,677 | 7/1969 | Mongerson | 137/246.13 |
| 3,633,870 | 1/1972 | Bayer | 251/355 |
| 4,187,880 | 2/1980 | Humpert et al. | 137/625.17 |
| 4,374,583 | 2/1983 | Barrington | 251/355 |

FOREIGN PATENT DOCUMENTS

| 1284209 | 7/1969 | Fed. Rep. of Germany . |
|---|---|---|
| 2731809 | 1/1979 | Fed. Rep. of Germany . |
| 2302461 | 9/1976 | France .............................. 251/355 |

Primary Examiner—Alan Cohan
Assistant Examiner—John A. Rivell
Attorney, Agent, or Firm—Karl F. Ross; Herbert Dubno

[57] ABSTRACT

A water valve with a hollow piston axially reciprocable in a cylindrical bore of a surrounding sleeve is provided, for long-term lubrication of the piston, with grease chambers formed as inwardly open peripheral recesses on the inner sleeve surfaces at opposite extremities thereof. The valve is preferably of the single-handle mixing type, the piston being rotatable within the sleeve for selectively connecting a cold-water inlet and/or a hot-water inlet with a common outlet; the region of water flow between these ports is isolated by sealing rings from the two grease chambers.

7 Claims, 1 Drawing Figure

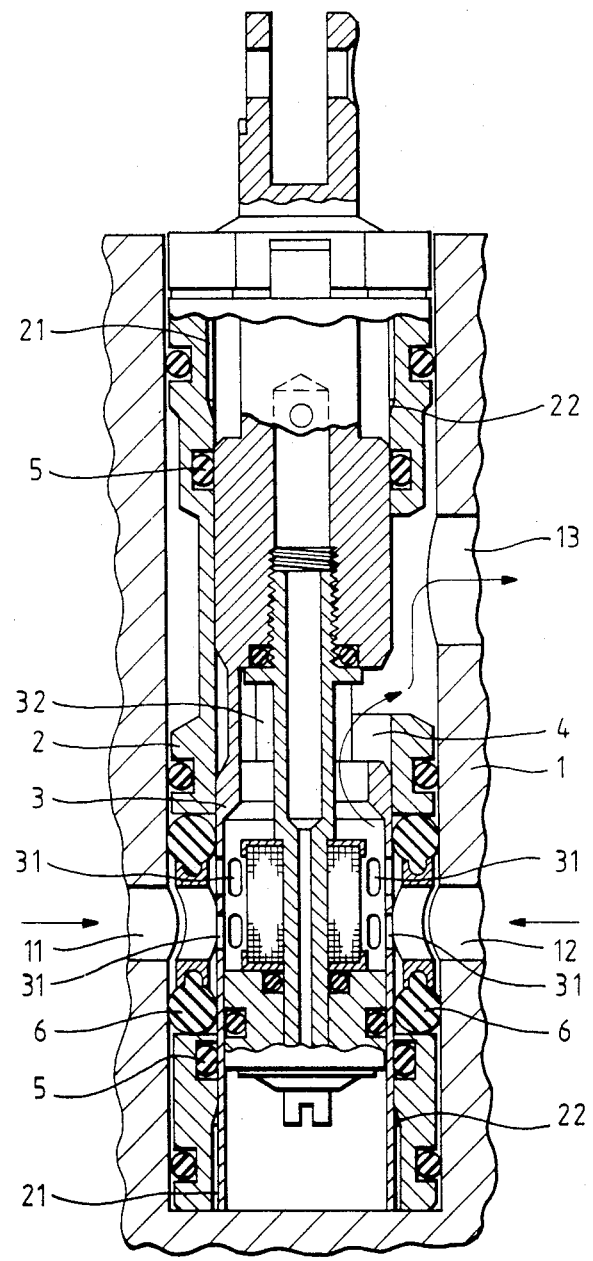

4,651,769

LUBRICATED WATER VALVE

This is a continuation of co-pending application Ser. No. 634,761 filed on July 26, 1984 now abandoned.

FIELD OF THE INVENTION

My present invention relates to a water valve of the type having a stationary outer member, namely a valve housing or a sleeve inserted in such a housing, which has a cylindrical bore provided with one or two lateral inlet ports (e.g. for cold and hot water) and a lateral outlet port axially offset therefrom. A piston axially displaceable in the cylindrical bore is formed with an internal channel, closed at its ends, and with peripheral apertures enabling that internal channel to communicate with the inlet and outlet ports in one axial position to establish a flow path therebetween. In other axial positions, the piston apertures are partly or fully disaligned from at least one of the ports to throttle or cut off the flow between them. With two inlet ports as noted above, rotation of the piston in its flow-establishing axial position enables cold or hot water alone, or a selected mixture thereof, to reach the outlet port for discharge into a faucet or the like. The ports and the intervening flow path are fluidically separated from the extremities of the bore by suitable sealing means.

BACKGROUND OF THE INVENTION

A single-handle mixing valve of the type just referred to is the subject matter of U.S. Pat. No. 4,187,880 in the names of Jürgen Humpert et al. In such a valve, as well as in simpler valves with only one inlet port, it is frequently found that the displacement of the piston in surrounding outer member becomes increasingly more difficult with the passage of time. This appears to be due to diminishing lubrication as grease initially provided at the contact surfaces of the piston and the bore wall is washed out by water leakage. To remedy this problem, it has already been proposed (see U.S. Pat. No. 3,372,904 in the names of Bernard A. Graham et al) to provide the interior of the piston with a grease chamber from which lubricant can be pumped by means of a screw designed to displace a piston head in that chamber upon being rotated with the aid of an external tool such as an Allen wrench. Such a system is somewhat unhandy and calls for operation by an expert whenever relubrication is desired.

OBJECT OF THE INVENTION

The object of my present invention is to provide an improved water valve, preferably one of the single-handle mixing type, in which such relubrication occurs automatically without the need for intervention by an operator.

SUMMARY OF THE INVENTION

I realize this object, in accordance with my present invention, by providing the inner surface of the outer member at its extremities with inwardly open peripheral recesses storing grease which is entrainable by the piston, during axial reciprocation thereof, past the sealing means for lubricating adjacent areas of contact between the piston and the outer member.

Advantageously, pursuant to a more particular feature of my invention, the recesses are coaxial cylindrical enlargements of the piston-receiving bore so that even a slight tilting of a piston during manipulation thereof will cause grease to be entrained by it toward the contact regions. I have found on the basis of tests that an optimum depth of the grease chambers is given when the diameter of the enlargements equals substantially 1.1 times the diameter of the remainder of the bore.

In accordance with another advantageous feature of my invention, the recesses have radially inwardly tapering bottoms at boundary zones remote from the ends of the bore so as to converge toward the piston in these zones. Such a configuration facilitates the entrainment of part of the contents of these chambers toward the aforementioned contact surfaces past the intervening sealing means.

BRIEF DESCRIPTION OF THE DRAWING

The above and other features of my invention will now be described in detail with reference to the accompanying drawing the sole FIGURE of which is a longitudinal axial sectional view of a mixing valve incorporating the present improvemnt.

SPECIFIC DESCRIPTION

The water valve shown in the drawing has a structure essentially corresponding to that shown in the above-identified patent to Humpert et al which can be referred to for details. It is therefore sufficient to describe the principal constituents of the valve along with the modifications applied thereto in accordance with my present invention.

The valve comprises, essentially, a housing 1 forming a well 14 in which a cylindrical sleeve 2 fixedly received. Sleeve 2 has a bore 15 centered on a vertical axis, accommodating a piston 3 which is rotatable and axially slidable therein with the aid of a nonillustrated handle attached to a coupling head 16. Housing 1 forms a cold-water inlet port 11 and a hot-water inlet port 12 aligned with respective openings 17 and 18 of sleeve 2 which, in the illustrated rotary position of piston 3 shown to be located at its lowest level, communicate by way of peripheral aperatures 31 of the sleeve with an internal channel 4 thereof closed at its upper and lower ends. By way of several peripheral cutouts 32, channel 4 communicates in all piston positions with well 14 and thus with an outlet port 13 of housing 1.

As disclosed in the Humpert et al patent, apertures 31 are provided only on a part of the circumference of sleeve 2 which has an imperforate portion enabling either inlet port 11, 12 to be partly or completely blocked whereby a selected ratio of hot to cold water can be established in the flow (see arrows) passing to outlet port 13. The overall flow rate can be reduced, or the flow can be fully cut off, by elevating the piston 3 above its illustrated level. The flow path is fluidically isolated from the lower extremity of bore 15 by sealing rings 6a, 6b, encircling openings 17 and 18, and from its upper extremity by a peripheral sealing ring 5'; a similar ring 5" lies just below sealing rings 6a, 6b. Beyond sealing rings 5' and 5", the extremities of bore 15 are radially enlarged to form an upper grease chamber 21' and a lower grease chamber 21" open toward the end faces of sleeve 2; at boundary zones 22', 22" remote from these end faces, the depth of the grease chambers porgressively decreases so that their bottoms converge toward the sleeve 2. Thus, even a slight eccentricity of sleeve 2—virtually unavoidable during its manipulation—will let a peripheral area thereof pick up some of the grease present in one or both chambers 21', 21" for entrainment past the seals 5', 5" and 6a, 6b to ensure continued lubrication. Extraction of the sleeve 2 enables the grease chambers to be refilled.

It will be apparent that sleeve 2 could be omitted, with grease chambers 21' and 21" machined directly into the peripheral wall of well 14. In that case, however, though the mode of operation would be practically unaltered, the machining of the lower chamber 21" at the bottom of the well would be more difficult.

I claim:

1. In a water valve having a stationary outer member with a cylindrical bore centered on an axis, having opposite axially spaced extremities, and provided with at least one lateral inlet port and a lateral outlet port axially offset from said inlet port, a piston axially displaceable between axially offset end positions in said outer member and formed with an internal channel closed at its ends, said piston being further provided with peripheral apertures enabling said channel to communicate with said inlet and outlet ports in one of the axial end positions to establish a flow path therebetween while being disaligned from at least one of said ports in the other axial end position to interrupt said flow path, respective end seals on said outer member engaging the piston and fluidically separating said ports from the extremities of said bore, the piston having end portions displaceable to the respective extremities and past the respective seals on axial displacement of the piston between its end positions, and a seal on the outer member around the inlet port and engaging the piston, the improvement wherein the inner surface of said outer member is provided at said extremities with respective inwardly open peripheral recesses open toward the piston; and respective bodies of grease generally fill the recesses, the grease being entrainable by the end portions of said piston during axial reciprocation thereof past the respective end seals and the inlet-port seal for lubricating same and adjacent areas of contact between said piston and said outer member.

2. A water valve as defined in claim 1 wherein said recesses are coaxial cylindrical enlargements of said bore.

3. A water valve as defined in claim 2 wherein said enlargements have a diameter equal to substantially 1.1 times the diameter of the remainder of said bore.

4. A water valve as defined in claim 2 wherein said recesses have radially inwardly tapering bottoms at boundary zones remote from the ends of said bore.

5. A water valve as defined in claim 1 wherein said outer member is a sleeve fixedly received in a surrounding valve housing having openings aligned with said inlet and outlet ports.

6. A water valve as defined in claim 5 wherein said recesses are axially open at the ends of said sleeve.

7. A water valve as defined in claim 5 wherein said piston is rotatable in said sleeve, the latter being provided with a cold-water inlet port and with a hot-water inlet port alignable with said apertures in said one axial position for enabling selective communication of said outlet port with either or both of said inlet ports.

* * * * *

UNITED STATES PATENT AND TRADEMARK OFFICE
CERTIFICATE OF CORRECTION

PATENT NO. : 4,651,769

DATED : March 24, 1987

INVENTOR(S) : Fritz Wagner

It is certified that error appears in the above-identified patent and that said Letters Patent is hereby corrected as shown below:

On the Title Page, Item [75], "Fritz Wagner" should be --Friedrich Wagner--.

Signed and Sealed this

Fourth Day of April, 1989

Attest:

DONALD J. QUIGG

Attesting Officer

Commissioner of Patents and Trademarks